United States Patent [19]
Ho

[11] Patent Number: 5,150,032
[45] Date of Patent: Sep. 22, 1992

[54] COMBINED CHARGING AND SUPPLY CIRCUIT

[75] Inventor: Joseph K.P. Ho, Kowloon, Hong Kong

[73] Assignee: Astec International Limited, Hong Kong

[21] Appl. No.: 519,276

[22] Filed: May 4, 1990

[30] Foreign Application Priority Data

May 4, 1989 [GB] United Kingdom ............... 8910193

[51] Int. Cl.[5] .............................................. H02J 7/00
[52] U.S. Cl. ...................................... 320/14; 307/48; 307/66
[58] Field of Search .................... 307/48, 66; 320/14

[56] References Cited

U.S. PATENT DOCUMENTS

| | | | |
|---|---|---|---|
| 3,293,445 | 12/1966 | Levy | 307/66 |
| 3,489,915 | 1/1970 | Engelhardt | 307/66 |
| 4,012,685 | 3/1977 | Nercession | 323/20 |
| 4,186,437 | 1/1980 | Cuk | 363/65 |
| 4,782,241 | 11/1988 | Baker et al. | 307/66 |
| 4,794,272 | 12/1988 | Bavaro et al. | 307/66 |
| 4,827,150 | 5/1989 | Reynal | 307/66 |

Primary Examiner—Steven L. Stephan
Assistant Examiner—Thomas M. Dougherty
Attorney, Agent, or Firm—McCubbrey, Bartels, Meyer & Ward

[57] ABSTRACT

A combined charging circuit for a rechargeable battery and supply circuit has a battery for supplying power to an output supply and an adaptor to provide from a mains supply power at a voltage greater than the fully charged voltage of the battery, both to supply power to the output in place of the battery and to charge the battery. A buck convertor acts as switching charger for the battery and comprises a rectifier across the battery, and an inductor and an electronic switch in series with on another and with the supply from the battery to the output supply, the switch acting as the switching element of the switching charger when the adaptor is powered from the mains and as a low ON resistance power switch when the battery is supplying power to the output supply.

5 Claims, 3 Drawing Sheets

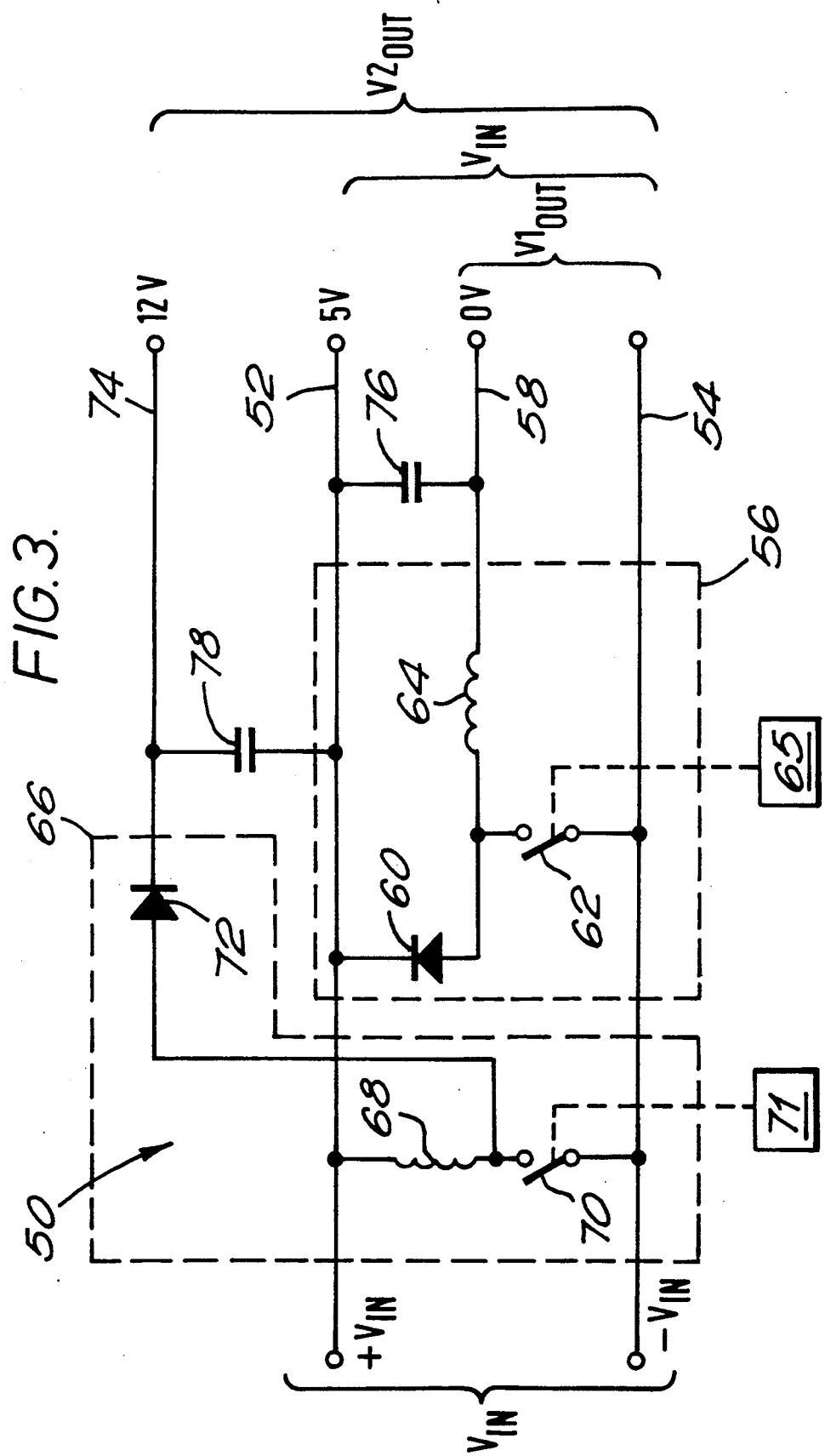

COMBINED CHARGING AND SUPPLY CIRCUIT

This invention relates to a combined charging and supply circuit. In particular the invention relates to a circuit which can be used to charge a rechargeable battery and to provide a regulated DC power supply from an AC mains supply. The circuit has particular application to the power supplies of portable personal computers or lap top computers as they are often known.

BACKGROUND TO THE INVENTION

One typical circuit used in this context is a linear charger circuit for a rechargeable battery. In such a case an adaptor provides a transformed output from the AC mains supply which provides a supply voltage via a rectifier to the DC-DC power supply of the computer. In addition, the output charges a rechargeable battery via a diode and transistor, and an output from the battery is supplied via a rectifier to the DC-DC power supply in the event that the mains supply is inoperative.

Another typical circuit uses a switching charger for the battery. However, rectifiers for the transformed AC mains supply and for the battery output are still required.

The power passing to the DC-DC power supply whether from the mains if this is operative or from the battery if this is supplying power, will in either case pass through a rectifier and so these need to be efficient to reduce heat generation and voltage drop. Generally they are therefore schottky rectifiers. Such rectifiers are relatively expensive, however, and still have a forward drop of around 500 millivolts, which if one assumes a typical current of 4 amps means a loss of 2 Watts which appears as heat.

This has serious disadvantages particularly when operating with battery power since this reduces the possible operating time on the internal batteries or alternatively forces the designer to use larger batteries which are a significant part of the overall weight and size of a compact portable personal computer. In addition a low efficiency equates with a higher heat output with the result that the loss appears as heat which, in a confined space, is not easy to dissipate. In particular, unlike normal desk-top personal computers the use of a ventilating fan or the like, would represent too significant a drain on the battery power. Therefore the power supply components cannot be packed closely together and the power supply must be of relatively large volume.

It is desirable therefore to reduce such losses and to achieve further improvement in the efficiency of the portable personal computer power supply.

BRIEF SUMMARY OF THE INVENTION

Therefore according to the invention, there is provided a combined charging circuit for a rechargeable battery and supply circuit, comprising a battery for supplying power to an output supply, an adaptor arranged to be connected to a source of mains current for providing power from that source at a voltage greater than the fully charged voltage of the battery to supply power to the said output supply in place of the battery and to charge the battery, and a buck converter acting as a switching charger for the battery and comprising a rectifier across the battery, and an inductor and electronic switch in series with one another and in series with the supply from the battery to the output supply, the switch acting as the switching element of the switching charger when the adaptor is powered from a source of mains current and as a low ON resistance power switch when the battery is supplying power to the output supply.

Such an arrangement is simple and uses a well known buck converter which is of high operating efficiency. Therefore the amount of heat generation can be relatively modest.

By using the electronic switch in this way one can eliminate two expensive schottky rectifiers, which represents a saving in cost and space. Additionally the efficiency can be increased when the output supply is drawn from the battery. Thus instead of drawing power through a schottky rectifier one draws power through an inductance which has very low DC resistance and the electronic switch which can have a much lower internal resistance in its ON state that the schottky rectifier. As an example the electronic switch can be a FET and an example of a well known commercially available FET which could be used is the one sold under the number IRZ40. This has maximum internal resistance of about 28 milliohms and, so assuming that it has to handle a 4 amp current, its loss would be of the order of 448 milliwatts. In a conventional arrangement where a schottky rectifier is used, this arrangement would typically absorb 2 Watts of energy for a 4 amp current. As can be seen the circuit of the invention results in a substantially lower heat output.

Also, as explained above, because of the lower heat output, it is possible to pack the components of the arrangement more tightly without suffering overheating which saves space. In addition the lower loss of energy enables one to use the same capacity batteries for a longer period or alternatively use lower capacity batteries, and either choice has obvious advantages in the power supply for a lap-top personal computer.

One restraint on the design of power supplies for portable personal computers is that the input to the power supply can come either from a rechargeable battery of from a rectified mains supply. As far as the battery is concerned this generally has a nominal voltage level of 12 volts but this varies substantially depending upon the charge on the battery and can be as low as say 11 volts or even 8.5 volts depending upon the number and type of batteries used, when approaching its fully discharged state, and as high as 16 volts when fully charged. Equally, when the power supply is drawn from the mains a suitable AC adaptor provides a rectified output usually at about 18 VAC.

The input voltage levels can therefore vary widely and the power supply has to cope with this and provide steady output DC voltages. The particular DC output voltages which are generally essential are a +12 volt DC output for operating the disc motors and the like and a +5 volt DC output for powering the electronics and these output voltages must be maintained to within very accurate limits.

In the past this has led to the use of power supplies which do not have a particularly high efficiency and in general the efficiency of conversion from the input power to the output power is around 70% and at the most 75%.

There are simple converter circuits which are known to be very efficient. For example a buck converter is simple and relatively efficient but operates under the constraint that the input voltage has to be greater than the output voltage. Equally a boost converter is well known to be simple and efficient. This operates under the reverse constraint that the input voltage has to be less than the output voltage. As explained above, however, because of the varied nature of the input voltage neither of these converters could be used on their own to convert the input power which might vary from as low as 8.5 volts to as high as 18 volts, to output power which is needed at 5 and 12 volts. As a result, power supplies for portable personal computers have tended to use a switched converter incorporating a transformer. In such converters the transformer allows one to provide a larger or smaller output voltage than the input voltage according to one's choice but the converter operates under the substantial constraint that it is considerably less efficient.

We have found according to a preferred embodiment of the invention that an overall power supply can be provided which can be of much smaller volume, e.g. one quarter to one half of the conventional arrangement for powering a lap-top personal computer. If the output from a circuit according to the invention is used to provide a DC input voltage to a DC-DC power supply whose value is $V_{IN}$ above a base line, the power supply comprising a buck converter to provide a first output DC voltage above the said base line of less than $V_{IN}$, and a boost converter to provide a second output DC voltage above the said base line of greater than $V_{IN}$, the arrangement being such that a first supply voltage of around 5 VDC is provided by the difference between $V_{IN}$ over the base line and the said first output DC voltage over the base line, and a second output supply voltage of around 12 volts VDC is provided by the sum of firstly the difference of the said second output DC voltage over the base line and $V_{IN}$ over the base line, and secondly the said first supply voltage.

Such an arrangement is simple and highly efficient and makes use of simple buck and boost converter circuits which are well known and which are efficient in operation. It is possible to use them in the arrangement provided because the actual first and second output DC voltages produced are not in fact the voltages of 5 and 12 volts DC which are required by the computer.

It is also the case that the actual output voltages of 5 and 12 volts which are required by the personal computer are not voltages measured in relation to the said base line of the voltage $V_{IN}$. This is not essential, however, since the voltage $V_{IN}$ itself needs no fundamental base line value relative the personal computer.

As mentioned above, conventional power supplies used for lap-top computer tend to have an efficiency of about 70% overall with an efficiency in the DC/DC converter equivalent to the power supply according to the invention being about 75%. By being able to use a buck and a boost converter in place of a switching convertor incorporating a transformer circuit, one can readily achieve an efficiency of conversion in the DC/DC converter of around 85% which is a significant improvement in efficiency. This significant improvement does of course allow one either to use smaller batteries or preferably to operate the personal computer for a longer period from the same battery as a conventional power supply.

The invention has additional advantages in that a transformer tends to need substantial space and in addition is heavy. Further the DC/DC power supply according to the invention, because of its higher efficiency, produces that much less heat. Accordingly the components can be packed more tightly without overheating and in any case a boost and a buck converter are very simple and require only a minimum number of components. Substantial savings on space for such a power supply are therefore possible and this is obviously of considerable advantage to people designing portable personal computers who wish to make them as small and light in weight as possible.

Even though a boost and a buck converter are provided in the arrangement according to the invention and so each requires its own electronic switch such as an FET, in practice this does not represent an increase in the number of components required over the conventional use of a switched transformer since in general the power handling capacities of FET's which are available at reasonable commercial prices are such that two are usually required in parallel to handle the relatively high current in the switching convertor circuit when a transformer is used.

BRIEF DESCRIPTION OF THE DRAWINGS

The invention will now be described, by way of example, with reference to the accompanying drawings, in which:

FIG. 3 is a circuit diagram of a DC-DC power supply which can be powered by the circuit shown in FIG. 2.

DESCRIPTION OF THE PREFERRED EMBODIMENT

Figure 1A:
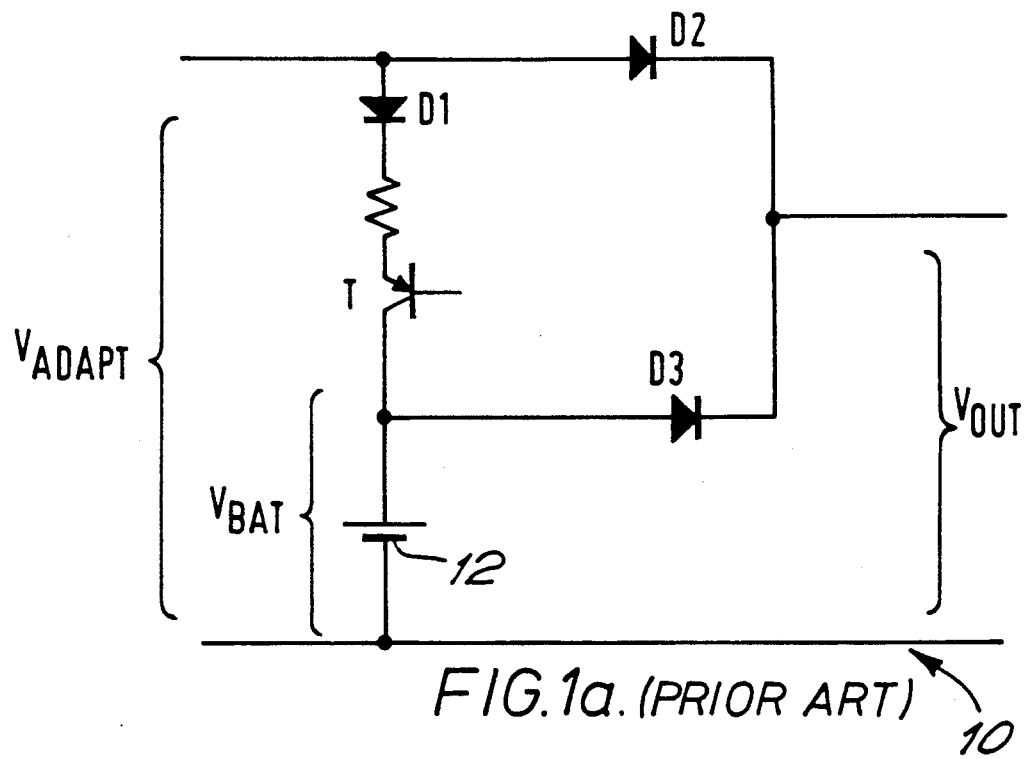
FIGS. 1a and 1b are circuit diagrams of a conventional linear charging circuit and conventional switching charging circuit, respectively.

The circuit 10 shown in FIG. 1a is a conventional linear charger for a rechargeable battery 12. The battery 12 can supply power through a rectifier $D_3$ to provide an output $V_{OUT}$ for the DC/DC convertor of a power supply of a lap top computer. As an alternative, when the adaptor is powered from the mains supply, the voltage $V_{ADAPT}$ is supplied through a rectifier $D_2$ to provide the output $V_{OUT}$. At the same time power is supplied via a diode $D_1$ and transistor T to charge the battery.

Figure 1B:
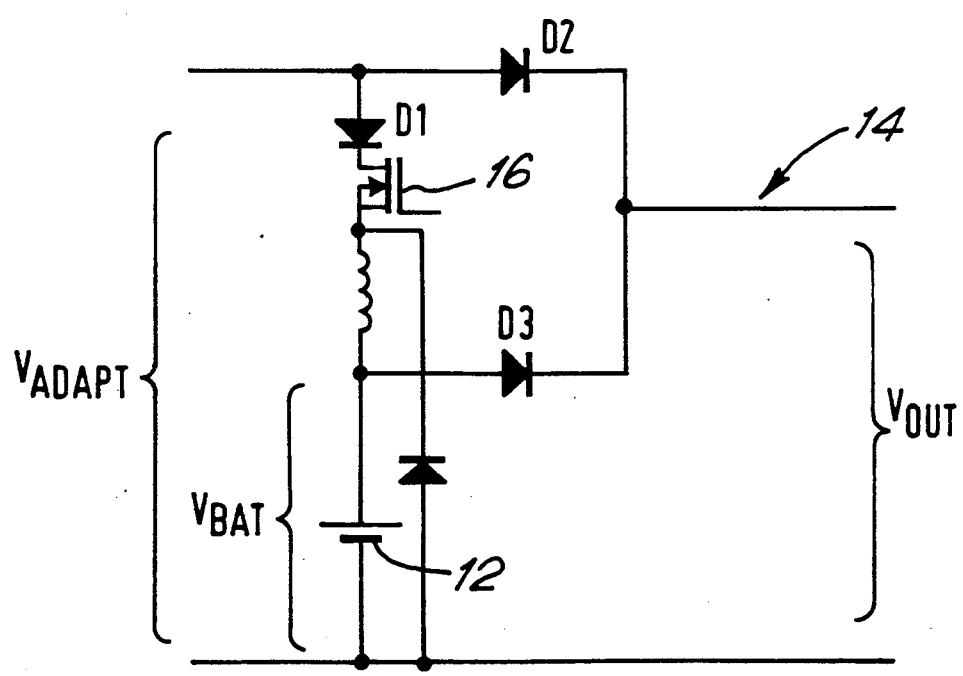

The circuit 14 shown in FIG. 1b shows a switching charger for the battery 12. Again the battery can supply power through the rectifier $D_3$ to the DC/DC convertor or alternatively, when the adaptor is powered from the mains supply, the adaptor applies power via the diode $D_2$. Also when the adaptor is powered by the mains, a buck convertor including a FET 16 provides power via the diode $D_1$ to charge the battery.

The diodes $D_1$ and $D_2$ are required in each circuit to prevent the flow of current from the battery to the adaptor in the event that the adaptor is plugged into the computer and the mains are not operating because the mains power has failed or not been switched on. The diodes $D_1$ and $D_2$ also protect the DC/DC convertor against an adaptor with reversed polarity.

These circuits receive power from a conventional adaptor which will comprise a transformer to give a voltage of around 18 volts. Some adaptors provide a regulated output, which is desirable for best efficiency and minimum temperature rise as required by safety agencies. Adaptors which have a regulated output almost always include a switching regulator.

In the circuits shown in FIGS. 1a and 1b, the rectifiers $D_1$, $D_2$ and $D_3$ need to be efficient to reduce heat generation and so these are generally schottky rectifiers to minimize voltage drops across them. Such rectifiers are however relatively expensive and in addition still have a forward drop of around 500 millivolts, which if one assumes a typical current of 4 amps means a loss of 2 Watts which appears as heat.

Figure 2:
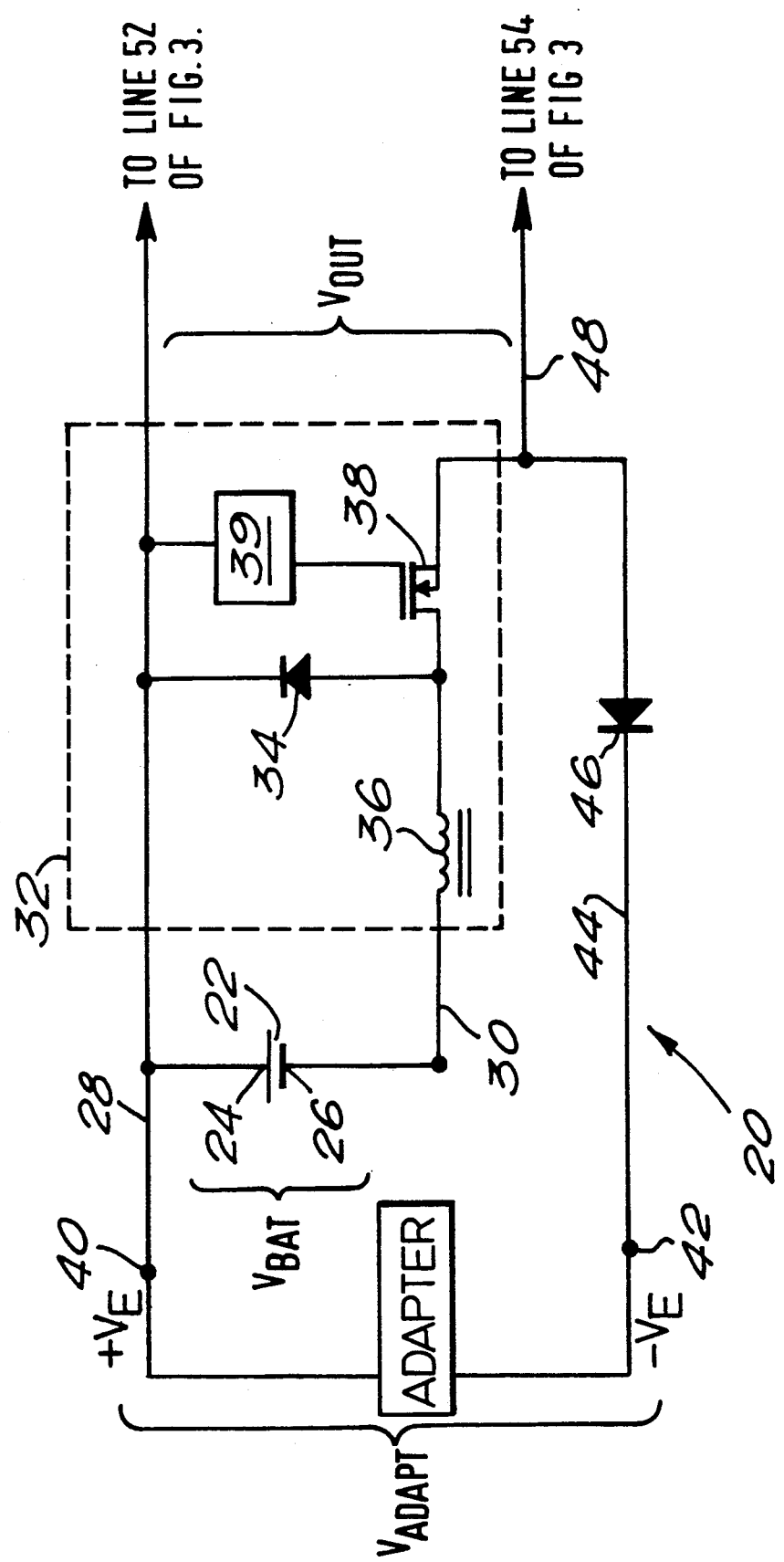
FIG. 2 is a circuit diagram of a combined charging and supply circuit according to the invention.

A circuit 20 according to the invention is shown in FIG. 2 which aims to reduce such losses.

The circuit 20 includes a rechargeable storage battery pack 22 having a positive output terminal 24 and a negative output terminal 26. Across these terminals appears a voltage $V_{BAT}$. The terminal 24 is connected to a common positive line 28 while the terminal 26 is connected to a negative line 30

Across the lines 28 and 30 is provided a buck converter 32. Such buck converters are well known as is their operation. The buck converter 32 includes a rectifier 34, an inductor 36 and an electronic switch 38 in the form of a FET. A switching circuit 39 is provided for the FET but is not shown in detail since again this is conventional. The inductor 36 and switch 38 are in series in the line 30 through which current is drawn from the battery pack 22.

A mains supply voltage is transformed in a manner not shown but entirely conventionally to provide an input adaptor voltage $V_{ADAPT}$. This appears across the positive terminal 40 on the line 28 and a negative terminal 42 on a line 44 which is common with the output from the switch 38 of the converter 32. In the line 44 is a diode 46, such as a schottky rectifier, and the line is connected to a negative output line 48.

The resulting DC output $V_{OUT}$ appears across the lines 28 and 48.

The FET 38 is used as the high frequency switching element when the AC adaptor provides an input voltage $V_{ADAPT}$ across line 40 and line 42. When the AC adaptor is removed or not in use, the battery pack 22 supplies power via the inductor 36 (which has a very small DC resistance) and the FET 38, which is turned on continuously (not switched at a high frequency). The combined voltage drop (and therefore power loss) across the inductor 36 and FET 38 is a small fraction (say 20%) of the voltage drop across a schottky diode used in a conventional circuit.

It is the case that when the circuit draws power from the adaptor, the diode 46 will have losses. However, that is no worse than the losses in the equivalent diode $D_2$ in the prior circuits shown in FIGS. 1a and 1b.

Also it will be noted that, compared with the circuits shown in FIGS. 1a and 1b, the circuit 20 employs two less diodes; i.e. diodes $D_1$ and $D_3$ are eliminated, with a consequent cost and space saving.

A problem which often arises in existing charging circuits where the negative terminals of the battery and adapter are electrically common, is that to turn on an N-channel FET one needs a higher positive voltage than is applied to its other electrodes. This means that one usually requires extra components to provide a voltage above the typically 18 volts available from the rectified and transformed mains supply. In the arrangement according to the invention however, this problem is avoided since the FET 38 can be turned on by electrically connecting its gate to the positive line 28 and no extra components to provide this voltage are required.

Although the arrangement shown in FIG. 2 uses the line 28 as a common positive to which the battery, adaptor and positive output are all connected, this is not essential but is the most convenient and economical arrangement if an N-channel MOSFET or an NPN transistor is used as the switch 38. Alternatively one could use a P-channel MOSFET or a PNP transistor as the switch 38 and in that case the negative line 48 would be used as a common negative for the battery, adaptor and negative output.

The circuit 20 can be used with advantage so that the output voltage $V_{OUT}$ provides the input DC voltage to a DC-DC power supply of the type shown in FIG. 3.

Referring to FIG. 3, the power supply circuit 50 shown has input terminals $+V_{IN}$ and $-V_{IN}$ across which an input DC voltage $V_{IN}$ is provided. This input voltage is provided by the output voltage $V_{OUT}$ from the circuit 20 shown in FIG. 2 by connecting the line 28 of FIG. 2 with an input line 52 in FIG. 3 and by connecting the line 48 of FIG. 2 with a base line 54 in FIG. 4.

The input voltage $V_{IN}$ for the circuit 50 across the lines 52 and 54 is supplied to a buck converter 56 to provide an output voltage $V1_{OUT}$ on a line 58 which is less than $V_{IN}$ above the base line 54. The buck converter 56 is of conventional construction and includes a diode 60, an electronic switch 62 which will normally be in the form of an FET and an inductor 64. The operation of such buck converters is well known and it is not believed that any further description is necessary. For simplicity components 65 associated with the switching and control of the FET 62 are not shown but can be entirely conventional.

In a similar manner a voltage $V2_{OUT}$ which is greater than $V_{IN}$ above the base line 54 is provided by a boost converter 66. This again is of conventional construction and operation and includes an inductor 68, an electronic switch 70 which can be similar and controlled in a similar way by components 71 to the electronic switch 62, and an output diode or rectifier 72. The output $V2_{OUT}$ above the base line 54 appears on an output line 74.

Across the line 58 and the line 52 is provided a capacitor 76 to smooth the output and in a similar fashion between the lines 74 and 52 is provided a capacitor 78.

It is well known that any particular output voltage within the constraints of the operation of a buck converter and of a boost converter are possible by appropriate choice of the values of the inductors 64 and 68 and switching rates of the FET's 62 and 70. Therefore the output voltages $V1_{OUT}$ and $V2_{OUT}$ are chosen in such a way that above the line 58, the line 52 is 5 volts DC and the line 74 is 12 volts DC. Thus the difference between $V_{IN}$ over the base line 54 and $V1_{OUT}$ over the base line 54 is arranged to be 5 volts. Equally, the difference of $V2_{OUT}$ over the base line 54 above $V_{IN}$ over the base line 54 is arranged to be 7 volts so that together with the 5 volts between the lines 58 and 52, the voltage appearing on line 74 above line 58 is 12 volts.

By combining the circuits of FIGS. 2 and 3 considerable increases in efficiency can be achieved as compared with conventional power supply circuits for a portable computer.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A combined charging circuit for a rechargeable battery and supply circuit, comprising a rechargeable battery having a first terminal and a second terminal for supplying power to an output supply having a first terminal and a second terminal, said first terminal of said battery being coupled to said first terminal of said output supply, an adaptor arranged to be connected to a source of mains current for providing power from that source at a voltage greater than the fully charged voltage of the battery to supply power to said output supply in place of the battery and to charge the battery, and a buck converter interposed between said battery and said output supply, said buck converter acting as a switching charger for the battery when said adapter is providing power from the source and providing a low resistance path when said battery is supplying power to said output supply, said buck converter comprising a rectifier across the battery, an inductor and an electronic switch in series with one another interposed between said second terminal of the battery and said second terminal of the output supply, and a switching circuit coupled to said electronic switch for controlling the operation of said electronic switch, said electronic switch acting as the switching element of the switching charger when the adaptor is powered from said source of mains current and as a low ON resistance conductive element between said battery and said output supply when the battery is supplying power to the output supply.

2. A circuit as claimed in claim 1 in which the electronic switch is a FET.

3. A circuit as claimed in claim 1 in which the FET comprises a gate terminal and a first and a second conduction terminal, said first conduction terminal being coupled to said second terminal of said output supply, said second conduction terminal being coupled to said inductor, said FET being turned on by connecting its gate terminal to the first terminal of the output supply.

4. A combined charging circuit for a rechargeable battery and supply circuit for producing first and second required DC output voltages for a portable personal computer, comprising a rechargeable battery having a first and a second terminal for supplying power to an output supply having a first and a second terminal, said first terminal of said battery being coupled to said first terminal of said output supply, an adaptor arranged to be connected to a source of mains current for providing power from that source at a voltage greater than the fully charged voltage of the battery to supply power to said output supply in place of the battery and to charge the battery, and a first buck converter interposed between said battery and said output supply, said first buck converter acting as a switching charger for the battery when said adapter is providing power from the source and providing a low resistance path when said battery is supplying power to said output supply, said first buck converter comprising a rectifier across the battery, an inductor and a first electronic switch in series with one another interposed between said second terminal of the battery and said second terminal of the output supply, and a switching circuit coupled to said first electronic switch for controlling the operation of said first electronic switch, said first electronic switch acting as the switching element of the switching charger when the adaptor is powered from said source of mains current and as a low ON resistance conductive element when the battery is supply power to the output supply, and a DC/DC power supply having a first and a second input terminal coupled to said first and said second terminals, respectively, of said output supply, the DC/DC power supply comprising a second buck converter coupled to said first and said second input terminals of said DC/DC power supply, said second buck converter generating at an output terminal a first predetermined voltage, said first predetermined voltage having a value less than the potential difference between said first and said second input terminals of said DC/DC power supply, said first required DC output voltage being equal to the voltage difference between said first input terminal of said DC/DC power supply and said output terminal of said second buck converter and being substantially equal to 5 volts, and a boost converter coupled to said first and said second input terminals of said DC/DC power supply, said boost converter generating at an output terminal a second predetermined voltage, said second predetermined voltage having a value more than the potential difference between said first and said second input terminals of said DC/DC power supply, said second required DC output voltage being equal to the voltage difference between said output terminal of said boost converter and said output terminal of said second buck converter and being substantially equal to 12 volts.

5. A circuit as claimed in claim 4 in which the second buck convertor and the boost convertor each include an electronic switch and those electronic switches are FET's.

* * * * *

UNITED STATES PATENT AND TRADEMARK OFFICE
CERTIFICATE OF CORRECTION

PATENT NO. : 5,150,032

DATED : September 22, 1992

INVENTOR(S) : Joseph K.P. Ho

It is certified that error appears in the above-identified patent and that said Letters Patent is hereby corrected as shown below:

On the Title page, item [57], col. 2,
In the Abstract on line 10, "on" should read -- one--.

In Column 2, line 19, "that" should be —than—.

In Column 2, line 42, "from should be deleted.

In Column 3, line 49, —to— should be inserted after "relative".

In Column 3, line 51, "computer" should be —computers—.

In Column 7, line 30, "1" should be —2—.

In Column 8, line 17, "supply" should be —supplying—.

Signed and Sealed this

Ninth Day of November, 1993

*Attest:*

BRUCE LEHMAN

*Attesting Officer*      *Commissioner of Patents and Trademarks*